(12) United States Patent
Zhang

(10) Patent No.: US 10,878,089 B2
(45) Date of Patent: *Dec. 29, 2020

(54) IDENTIFYING MALWARE BASED ON CONTENT ITEM IDENTIFIERS

(71) Applicant: Dropbox, Inc., San Francisco, CA (US)

(72) Inventor: Ray Zhang, San Jose, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/681,146

(22) Filed: Nov. 12, 2019

(65) Prior Publication Data

US 2020/0082077 A1 Mar. 12, 2020

Related U.S. Application Data

(63) Continuation of application No. 15/685,215, filed on Aug. 24, 2017, now Pat. No. 10,503,900.

(51) Int. Cl.
*G06F 12/14* (2006.01)
*G06F 21/56* (2013.01)
*H04L 29/06* (2006.01)

(52) U.S. Cl.
CPC .......... *G06F 21/56* (2013.01); *G06F 21/564* (2013.01); *H04L 63/1408* (2013.01)

(58) Field of Classification Search
CPC ..... G06F 21/56; G06F 21/561; H04L 63/145; H04L 63/1441
USPC ........................................................ 726/22
See application file for complete search history.

(56) References Cited

U.S. PATENT DOCUMENTS

| | | | |
|---|---|---|---|
| 8,701,162 | B1 | 4/2014 | Pedersen |
| 9,038,186 | B1 | 5/2015 | Manadhata et al. |
| 9,332,025 | B1 | 5/2016 | Watson et al. |
| 10,192,052 | B1 | 1/2019 | Singh et al. |
| 2004/0210640 | A1 | 10/2004 | Chadwick et al. |
| 2014/0208426 | A1 | 7/2014 | Natarajan et al. |
| 2014/0331325 | A1 | 11/2014 | Yoo |
| 2015/0319182 | A1 | 11/2015 | Natarajan et al. |
| 2017/0134397 | A1 | 5/2017 | Dennison et al. |
| 2018/0293389 | A1 | 10/2018 | Mahaffey et al. |

(Continued)

OTHER PUBLICATIONS

Purohit et al, Intent Classification of Short-Text on Social Media, 2015, IEEE, pp. 222-228.*

(Continued)

*Primary Examiner* — Alexander Lagor
*Assistant Examiner* — Jenise E Jackson
(74) *Attorney, Agent, or Firm* — DLA Piper LLP (US)

(57) ABSTRACT

Disclosed are systems, methods, and non-transitory computer-readable storage media for identifying malware based on content item identifiers. For example, a system for detecting malware can be made more efficient by reducing the number of content items that are scanned or analyzed for malicious software code or computer instructions. The number of content items that need to be scanned can be reduced by identifying suspicious content items based on tokens (e.g., strings of characters) commonly used by malware in the identifiers of malware related content items and then analyzing the identified suspicious content items for malicious content (e.g., malicious software instructions) using the anti-malware software.

20 Claims, 7 Drawing Sheets

(56) References Cited

U.S. PATENT DOCUMENTS

2019/0036945 A1   1/2019   Dennison et al.
2019/0065741 A1   2/2019   Zhang

OTHER PUBLICATIONS

Robertson et al, Modelling Score Distributions Without Actual Scores, Oct. 2, 2013, ACM, pp. 85-92.*

Srinivasan, et al., "Learning to Tokenize Web Domains," WWW 2011, ACM978-1-4503-0632, dated Mar. 28, 2011-Apr. 1, 2011, pp. 129-130.

Purohit, et al., "Intent Classification of Short-Text on Social Media," 2015 IEEE International Conference, dated Dec. 21, 2015, pp. 222-228.

* cited by examiner

IDENTIFYING MALWARE BASED ON CONTENT ITEM IDENTIFIERS

CROSS-REFERENCE TO RELATED APPLICATION INFORMATION

This is a continuation of U.S. patent application Ser. No. 15/685,215, filed Aug. 24, 2017, which is incorporated herein by reference in its entirety.

BACKGROUND

Malware (e.g., malicious software, viruses, ransomware, etc.) is typically detected using anti-malware software. The anti-malware software can scan, parse, or analyze the content of content items to determine whether the content items include software code (e.g., machine instructions) that are known to correspond to malicious software. This analysis of the content of content items may require a lot of computing resources to perform. When a system (e.g., a content management system) includes a large number of content items, it may be impractical for the anti-malware software to scan all content items managed by the system. Thus, a mechanism is needed to quickly identify suspicious content items that should be analyzed by the anti-malware software and/or reduce the number of content items that need to be analyzed by the anti-malware software.

SUMMARY

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for identifying malware based on content item identifiers. For example, a system for detecting malware can be made more efficient by reducing the number of content items that are scanned or analyzed for malicious software code or computer instructions. The number of content items that need to be scanned can be reduced by identifying suspicious content items based on tokens (e.g., strings of characters) commonly used by malware in the identifiers of malware related content items and then analyzing the identified suspicious content items for malicious content (e.g., malicious software instructions) using the anti-malware software.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for an efficient mechanism for identifying and scanning suspicious content items for malicious content. As more and more content items are managed by content management systems, the task of identifying and/or removing malicious content from these systems becomes more burdensome and requires a greater amount of computing resources. Efficiently identifying suspicious content items and scanning the suspicious content items for malicious content is an important part of reducing the computing resources needed to perform the malware scanning task.

Figure 1:
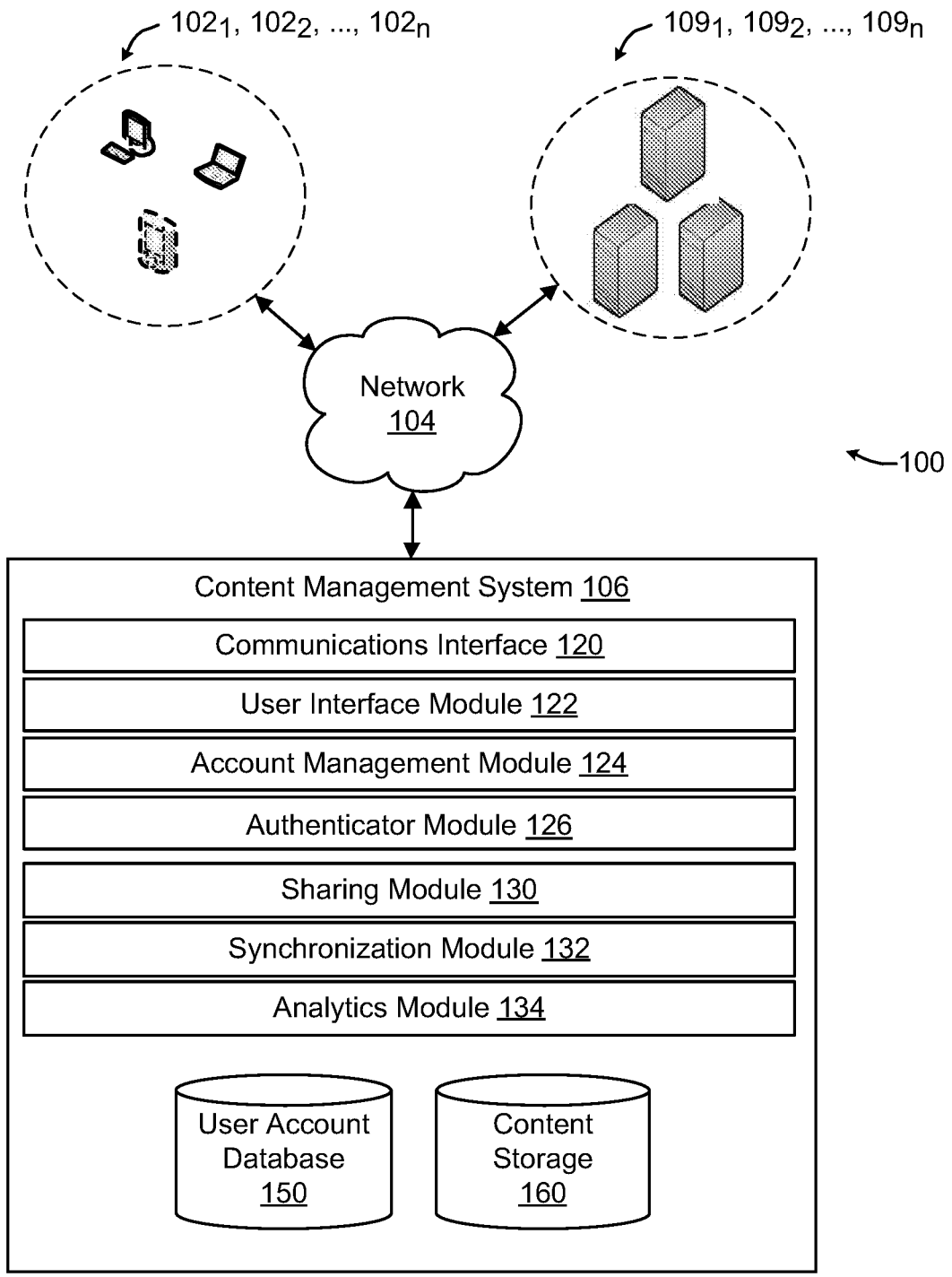
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., a synchronized content management system) through client devices $102_1$, $102_2$, ..., $102_n$ (collectively "102") connected to network 104 by direct and/or indirect communication. Content management system 106 can include a single computing device (e.g., a server) or multiple computing devices (e.g., multiple servers) that are configured to perform the functions and/or operations necessary to provide the services described herein. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content items, as well as perform a variety of content management tasks, such as retrieve, modify, browse, and/or share the content items. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content items, such as digital data, documents, text files, audio files, video files, etc., from one or more client devices 102 authorized on the account. The content items can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content items from one or more client devices 102. The synchronization can be platform agnostic. That is, the content items can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content items that have been updated at content management system 106 and synchronize those changes to the local collection. The client software can provide notifications of synchronization operations, and can provide indications of content statuses directly within the content management application. Sometimes client device $102_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers 109$_1$, 109$_2$, . . . , 109$_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or fewer components are possible.

Figure 2:
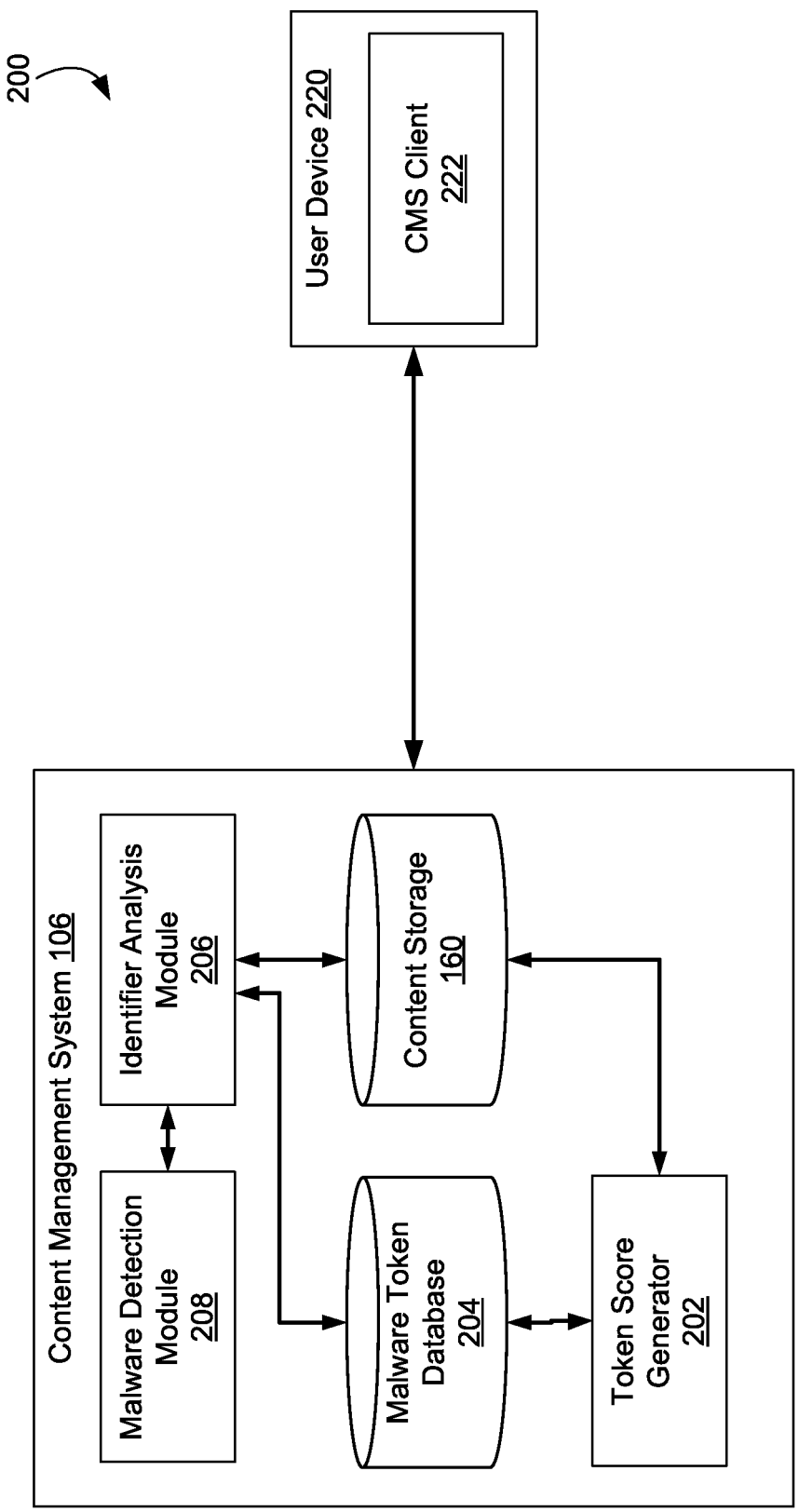
FIG. 2 is a block diagram of an example system for identifying malware based on content item identifiers.

FIG. 2 is a block diagram of an example system 200 for identifying malware based on content item identifiers. To identify malware based on content item identifiers, system 200 can determine tokens (e.g., strings of characters) in a content item identifier (e.g., content item name, system path, etc.). System 200 can compare the tokens in the content item identifier to tokens that have been scored by system 200. For example, the score assigned to a token can reflect how frequently the token appears in malware related files relative to all files managed by content management system 106. The higher the score, the more the token relates to malicious content items and the less the token relates to non-malware content items. System 100 can then generate a score for a content item based on the tokens found within the content item's identifier. If the score is larger than a threshold value, then system 100 can identify the content item as a suspicious content item. Suspicious content items can then be scanned or analyzed using anti-malware software to determine if the suspicious content item actually includes malicious software instructions (e.g., code).

In some implementations, system 200 can correspond to system configuration 100 of FIG. 1. Like system 100, system 200 can include content management system 106 and content storage 160. Content storage 160 can store content items managed by content management system 106, as described above.

In some implementations, content management system 106 can include token score generator 202. For example, token score generator can generate scores for tokens found within content item identifiers. For example, content storage 160 can include content items managed by content management system 106. Some of the content items in content storage 160 can be identified (e.g., in metadata, database records, etc.) by content management system 106 as malicious content items (e.g., malware, viruses, etc.). Some of the content items in content storage 160 can be non-malware (e.g., not malicious) content items. Token score generator 202 can parse the content item identifiers for the content items in content storage 106 to determine tokens within the content item identifiers. For example, token score generator 202 can use various delimiters, such as underscores, capital letters, punctuation, etc., to extract tokens from content item identifiers. Token generator 202 can, for example, parse a content item identifier "office_activator.exe" to generate the tokens "office," "activator," and "exe," for example. Token score generator 202 can determine how many times each token is found within content item identifiers for a malicious content item stored in content storage 160 (e.g., malware frequency or "MF"). Token score generator 202 can determine how many times each token is found within content item identifiers for all content items stored in content storage 160 (e.g., corpus frequency or "CF"). Token score generator can then determine the token score for a token by dividing the malware frequency by the corpus frequency (e.g., MF/CF=token score). Token score generator 202 can then store the token and corresponding malware frequency, corpus frequency, and/or token score for each token found in the content item identifiers of content items in content storage 160 in a respective token record in malware token database 204. Thus, malware token database 204 can include a separate record for each token found in the content item identifiers of content items in content storage 160 that includes the token string, malware frequency, corpus frequency, and/or token score.

In some implementations, token score generator 202 can generate token scores periodically. For example, token score generator 202 can generate token scores for tokens found in content item identifiers for content items stored in content storage 160 daily, weekly, or according to some other recurring period. Alternatively, token score generator 202 can generate token scores in response to some event. For example, token score generator 202 can generate token scores in response to determining that the amount of content stored in content storage 160 has increased or changed by a threshold amount (e.g., 10%, one terabyte, etc.). Thus, malware token database 204 can be updated as the tokens used in malicious content item identifiers change over time.

In some implementations, content management system 106 can include identifier analysis module 206. For example, identifier analysis module 206 can determine whether a selected content item a suspicious content item based on the content item's identifier. For example, when a user selects a content item managed by content management system 106 (e.g., stored in content storage 160), identifier analysis module 206 can determine, based on the tokens in the identifier for the selected content item, whether the content item is a suspicious content item. Identifier analysis module 206 can parse the content item identifier for the selected content item to determine tokens within the content item identifier. For example, identifier analysis module 206 can use various delimiters, such as underscores, capital letters, punctuation, etc., to extract tokens from content item identifiers. Identifier analysis module 206 can parse a content item identifier "office_activator.exe" to generate the tokens "office," "activator," and "exe," for example.

After determining the tokens in the identifier for the selected content item, identifier analysis module 206 can generate a content item identifier score for the selected content item based on the token scores corresponding to the tokens in the content item identifier. For example, for each token in the content item identifier, identifier analysis module 206 can obtain the respective token score from malware token database 204. By comparing a token string extracted or obtained from the content item identifier to token strings in malware token database 204, identifier analysis module 206 can determine a token record in malware token database 204 that corresponds to the token string in the content item identifier. Identifier analysis module 206 can then obtain the token score for the token string from the determined token record in malware token database 204.

In some implementations, the content item identifier score can correspond to the maximum token score for all tokens in the content item identifier. For example, when the content item identifier includes three tokens T1, T2, and T3 that have respective scores 20.2, 3.1, and 42.3, identifier analysis module 206 can determine that the maximum token score among the three tokens is 42.3. Identifier analysis module 206 can then determine the identifier score for the user selected content item based on the highest token score. For example, identifier analysis module 206 can determine that the content item identifier score for the selected content item is 42.3.

In some implementations, the content item identifier score can correspond to a summation of token scores for all tokens in the content item identifier. For example, when the content item identifier includes four tokens T1, T2, T3, and T4 that have respective scores 20.2, 3.1, 42.3 and 5.6, identifier analysis module 206 can determine that the summation of the scores for the four tokens is 71.2. Identifier analysis module 206 can then determine the identifier score for the user selected content item based on the token score summation. For example, identifier analysis module 206 can determine that the content item identifier score for the selected content item is 71.2.

In some implementations, identifier analysis module 206 can determine that a content item is a suspected malicious content item based on the identifier score calculated for the content item. For example, identifier analysis module 206 can be configured with a threshold value (e.g., 40, 65, 21, etc.) for determining when a content item is suspected of being a malicious content item. Identifier analysis module 206 can determine a content item score for a content item and compare the content item score to the threshold value. When the content item score for a corresponding content item is greater than the threshold value, then identifier analysis module 206 can determine that the content item is a suspicious content item. In some implementations, the content item score can correspond to the content item identifier score described above. Thus, when the identifier score is greater than the threshold value, identifier analysis module 206 can determine that the content item identifier includes tokens that are strong indicators that the corresponding content item is associated with malware (e.g., malicious software) and determine that the content item is suspect.

In some implementations, identifier analysis module 206 can determine that a content item is a suspected malicious content item based on how long a user has had an account with content management system 106. For example, identifier analysis module 206 can determine how long (e.g., an amount of time) a user account (e.g., the user account accessing the content item, the user account storing the content item, the user account that uploaded the content item to content management system 106, etc.) has been registered with or configured on content management system 106. Identifier analysis module 206 can then calculate the content item score, described above, based on the identifier score for the selected content item and the amount of time that the user account has existed (e.g., use account age) with content management system 106.

For example, the amount of time that the user account has existed on content management system 106 can increase the content item score when the amount of time is small (e.g., less than 1 year). The amount of time that the user account has existed on content management system 106 can decrease, or have no effect on, the content item score when the amount of time is large (e.g., greater than 1 year). For example, a malicious user who wishes to distribute malicious content items is likely to have a user account on content management system 106 for only a short time, while a legitimate user is likely to have an account on content management system 106 for a longer period of time. Thus, content items uploaded, stored, and/or distributed by users having accounts for a short period of time can be subject to greater scrutiny than content items uploaded, stored and/or distributed by users who have had an account for longer periods of time. An example formula for using the age of a user's account to determine a content item score could be to map a range of ages to age scores (e.g., 0-1 year=10, 1-5 years=5, 5 or more years=0) and add the age score to the identifier score to calculate the content item score. For example, if the user account age is 6 months and the identifier score is 45, then the content item score would be 55. If the threshold value for determining a suspicious content item is 50, then the young age of the user account would cause the content item to be flagged as a suspicious content item.

In some implementations, identifier analysis module 206 can cause content management system 106 to prevent distribution of a suspicious content item. For example, when the user selects a content item that identifier module 206 determines is suspicious, identifier analysis module 206 can cause content management system 106 to present a message to the user on the user's device indicating that the content item is unavailable. Identifier analysis module 206 can then request that malware detection module 208 perform a full malware scan of the suspicious content item.

In some implementations, content management system 106 can include malware detection module 208. For example, malware detection module 208 can be anti-malware software that is configured to scan the contents of a content item to determine whether the content item contains malicious computer instructions. When malware detection module 208 scans a suspicious content item and determines that the suspicious content item does not contain malicious computer instructions, malware detection module 208 can store information in content management system 106 (e.g., in metadata for the suspicious content item) indicating that the suspicious content item is not malicious. Content management system 106 can then allow the content item to be accessed and/or downloaded by users of content management system 106.

When malware detection module 208 scans a suspicious content item and determines that the suspicious content item contains malicious computer instructions, malware detection module 208 can store information in content management system 106 (e.g., in metadata for the suspicious content item) indicating that the suspicious content item is malicious. Content management system 106 can then prevent the malicious content item from being accessed and/or downloaded by users of content management system 106. For example, content management system 106 can delete or quarantine the malicious content item so no users can access or download the malicious content item.

In some implementations, system 200 can include user device 220. For example, user device 220 can correspond to one of client devices $102_i$ described above. User device 220 can be, for example, a computing device, such as a laptop computer, tablet computer, smartphone, smart watch, or any other type of computing device. User device 220 can include content management system (CMS) client 222. CMS client 222 can be a native client application configured to present various graphical user interfaces on a display of user device 220 for accessing content items and/or features provided by content management system 106. CMS client 222 can be a web client downloaded from content management system 106 and presented in a web browser on user device 220. The web client running in the web browser can present various graphical user interfaces on a display of user device 220 for accessing content items and/or features provided by content management system 106.

Figure 3:
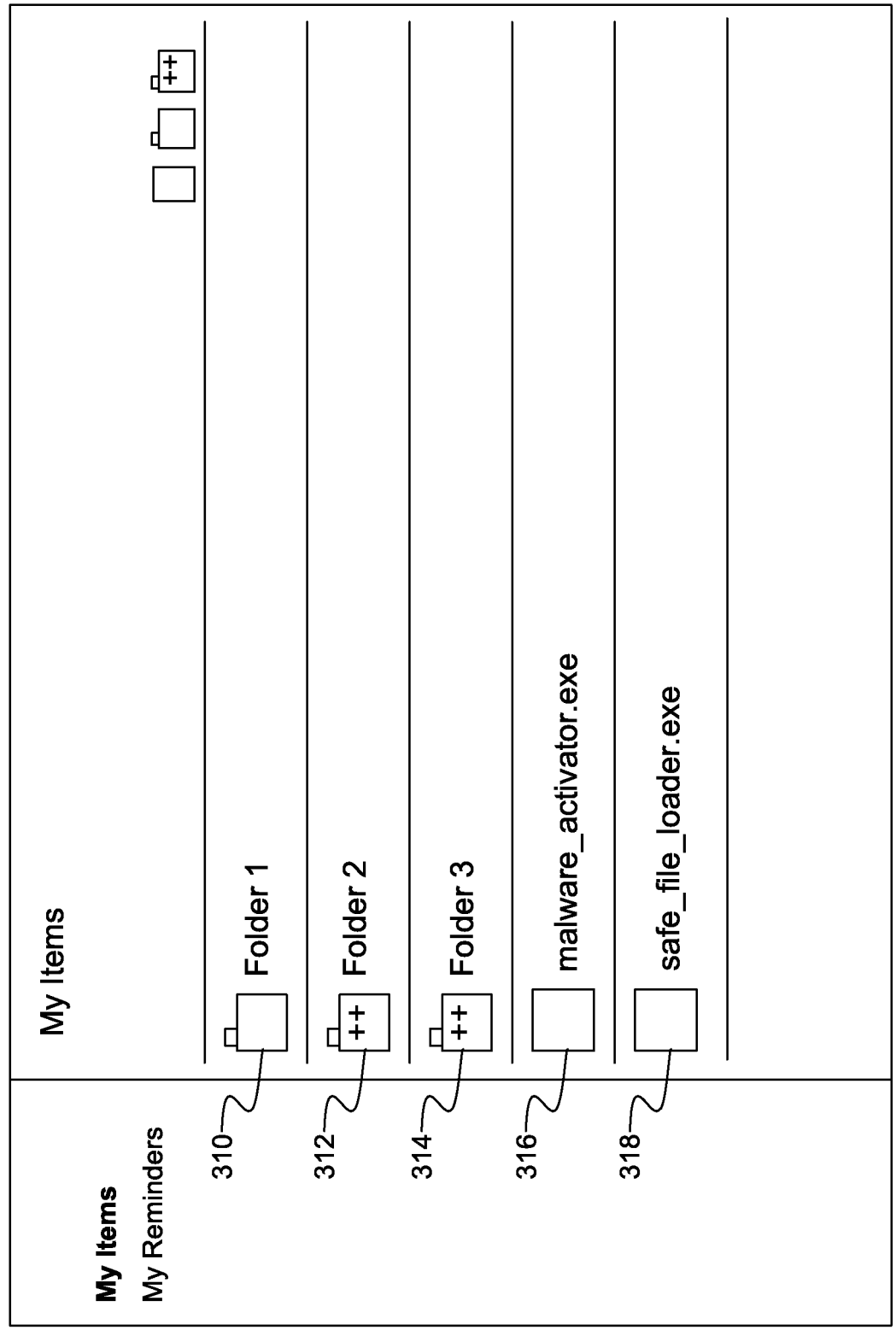
FIG. 3 illustrates an example graphical user interface for browsing content items managed by a content management system.

FIG. 3 illustrates an example graphical user interface 300 for browsing content items managed by content management system 106. For example, graphical user interface (GUI) 300 can be presented by CMS client 222 on user device 220 after a user has logged into the user's account with content management system 106. CMS client 222 can interact (e.g., exchange messages) with content management system 106 to obtain information for rendering GUI 300, for example.

In some implementations, GUI 300 can include content items 310-318. For example, content items 310-314 can correspond to folders or collections of content items. Content items 316-318 can correspond to individual content items. A user can, for example, select one of content items 310-318 to download, view, edit, or otherwise interact with the selected content item. For example, the user of user device 220 can select content item 316 represented on GUI 300. In response to receiving the selection, CMS client 222 can send a message to content management system 106 requesting access to content item 316. Upon receiving the request to access content item 316, content management system 106 (e.g., identifier analysis module 206) can analyze the content item identifier corresponding to the selected content item and/or the age of the user's account to determine whether the selected content item 316 is a suspicious content item, as described above.

Figure 4:
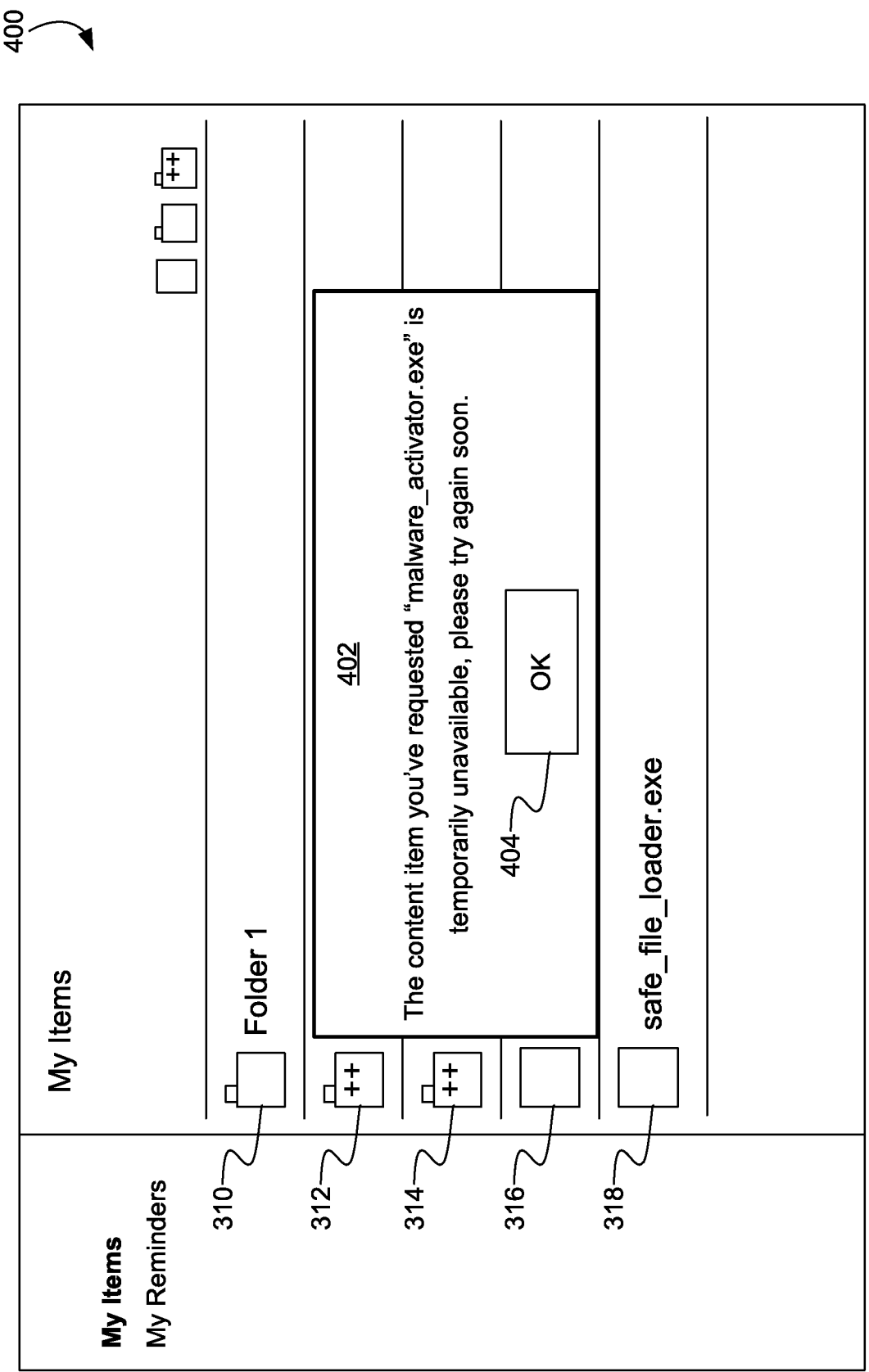
FIG. 4 illustrates an example graphical user interface for presenting a notification regarding an unavailable content item.

FIG. 4 illustrates an example graphical user interface 400 for presenting a notification regarding an unavailable content item. For example, GUI 400 can be presented by CMS client 222 in response to receiving a message from content management system 106 indicating that a user-selected content item is unavailable. For example, a user can select a content item through GUI 300, as described above. CMS client 222 can send a message to content management system 106 requesting access to the selected content item. Content management system 106 (e.g., identifier analysis module 206) can determine based on the content item identifier corresponding to the selected content item and/or the age of the user's account that the content item is a suspicious content item. In response to determining that the selected content item is suspected of being a malicious content item, content management system 106 can send a message to CMS client 222 indicating that the selected content item is unavailable. When the message is received by CMS client 222, CMS client 222 can present GUI 400.

In some implementations, GUI 400 can include graphical element 402. For example, graphical element 402 can be a popup, window, overlay, prompt, or some other graphical element for presenting information on the display of user device 220. Graphical element 402 can include text that describes or indicates that the content item selected by the user is unavailable. For example, graphical element 402 can include text indicating that the selected content item is temporarily unavailable. When the content item is temporarily unavailable, graphical element 402 can suggest that the user try to access the content item again at some later time. The user can dismiss graphical element 402 by selecting graphical element 404 (e.g., a button).

Figure 5:
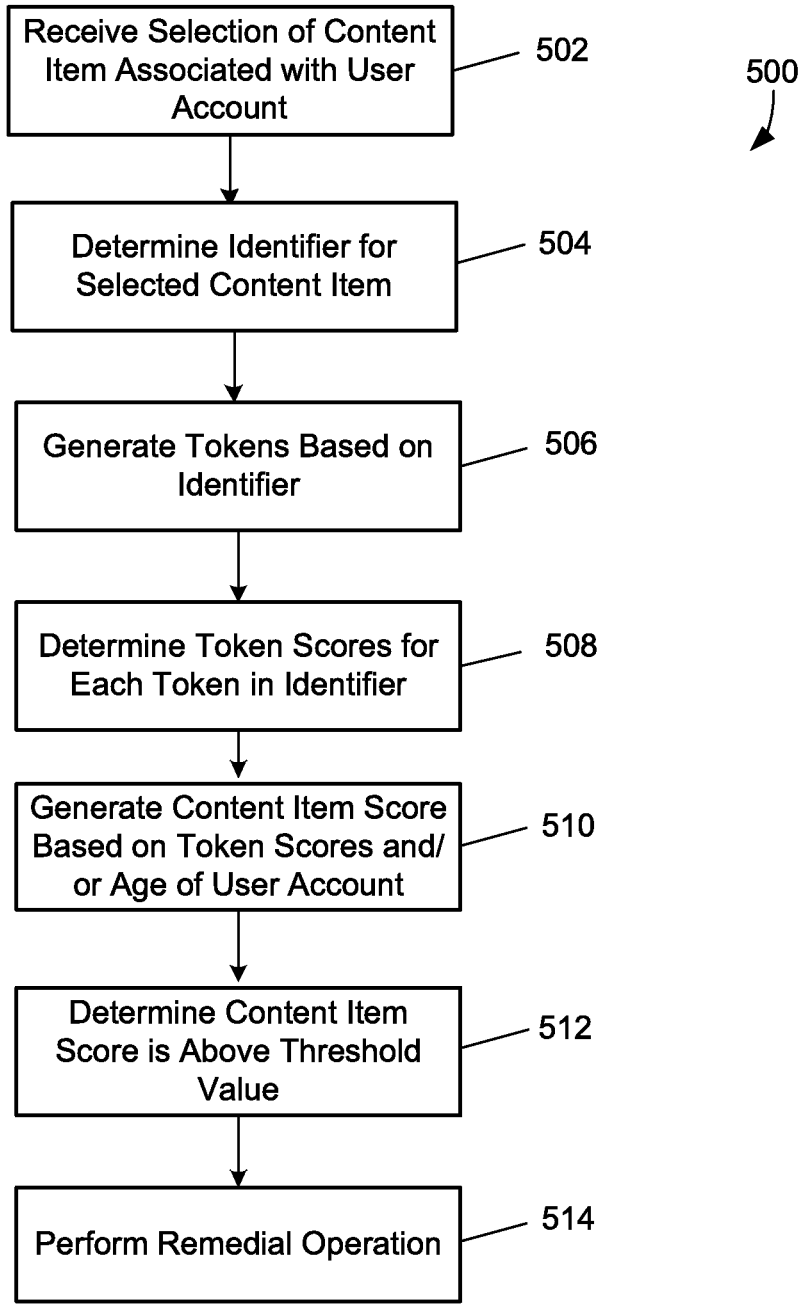
FIG. 5 is a flow diagram of an example process for identifying malware based on content item identifiers.

FIG. 5 is a flow diagram of an example process 500 for identifying malware based on content item identifiers. Process 500 can be performed by content management system 106 in response to receiving a request from CMS client 222 to access a content item selected by the user of user device 220. In some implementations, process 500 can be performed by content management system 106 in response to receiving a request from CMS client 222 to add a selected content item to content management system 106, change or edit a selected content item managed by content management system 106, or when the content item identifier for the selected content item has changed.

At step 502, content management system 106 can receive a selection of a content item associated with a user account. For example, content management system 106 can store data that associates the content item with a user account through which the content item was uploaded to content management system 106. Content management system 106 can store data that associates the content item with a user account that stores the content item.

At step 504, content management system 106 can determine an identifier for the selected content item. For example, content management system 106 can determine or obtain a name associated with the content item. The name can be a string of characters that the content item was assigned when it was created and/or stored on content management system 106.

At step 506, content management system 106 can generate tokens based on the content item identifier. For example, content management system 106 can parse the character string to extract or obtain tokens (e.g., sub-strings) within the content item identifier. As described above, content management system 106 can identify various delimiters or token separators within the character string and use the delimiters to determine the beginning and/or end of each token within the content item identifier. Additionally or alternatively, content management system 106 can perform string matching to identify known tokens within the content item identifier.

At step 508, content management system 106 can determine token scores for each token in the content item identifier. For example, content management system 106 can obtain the token score for each token in the content item identifier from malware token database 204, as described above.

At step 510, content management system 106 can generate a content item score for the selected content item based on the token scores and/or the age of the user account associated with the content item. For example, content management system 106 can generate the content item score based on the highest token score of all tokens found within the content item identifier. Content management system 106 can generate the content item score based on a summation of the token scores for all tokens found within the content item identifier.

In some implementations, content management system 106 can generate or adjust the content item score based on the age of the user account associated with the content item. For example, content management system 106 can increase the content item score when the amount of time that the user account has existed is very small or very short, as described above.

At step 512, content management system 106 can determine that the content item score for the selected content item is above a threshold value. For example, content management system 106 can be configured with a threshold value that corresponds to a content item score that is indicative of an association between a content item and known malicious software. Thus, when content management system 106 generates a content item score for a content item (e.g., based on token scores and/or age of a user account) that is above the threshold value, content management system 106 can determine that the content item is likely associated with malicious software.

At step 514, content management system 106 can perform a remedial operation with respect to the selected content item. For example, in response to determining that the content item score for the selected content item is above the threshold value, content management system 106 can perform a remedial operation or operations to prevent the spread of malware by content management system 106. In some implementations, the remedial operation can be that content management system 106 causes a notification to be presented on the user's device warning the user who selected the content item that the content item is unavailable, as described above with respect to FIG. 4. In some implementations, the remedial operation can be that content management system 106 performs a full scan (e.g., virus scan, malware scan, etc.) of the content item to determine if the content item includes malicious computer instructions. For example, when content management system 106 determines that the selected content item includes malicious code (e.g., computer instructions), content management system 106 can prevent the distribution (e.g., downloading, sharing, executing, selecting, browsing, etc.) of the content item. When content management system 106 determines that the selected content item does not include malicious code (e.g., computer instructions), content management system 106 can allow the distribution of the content item through content management system 106.

Figure 6A:
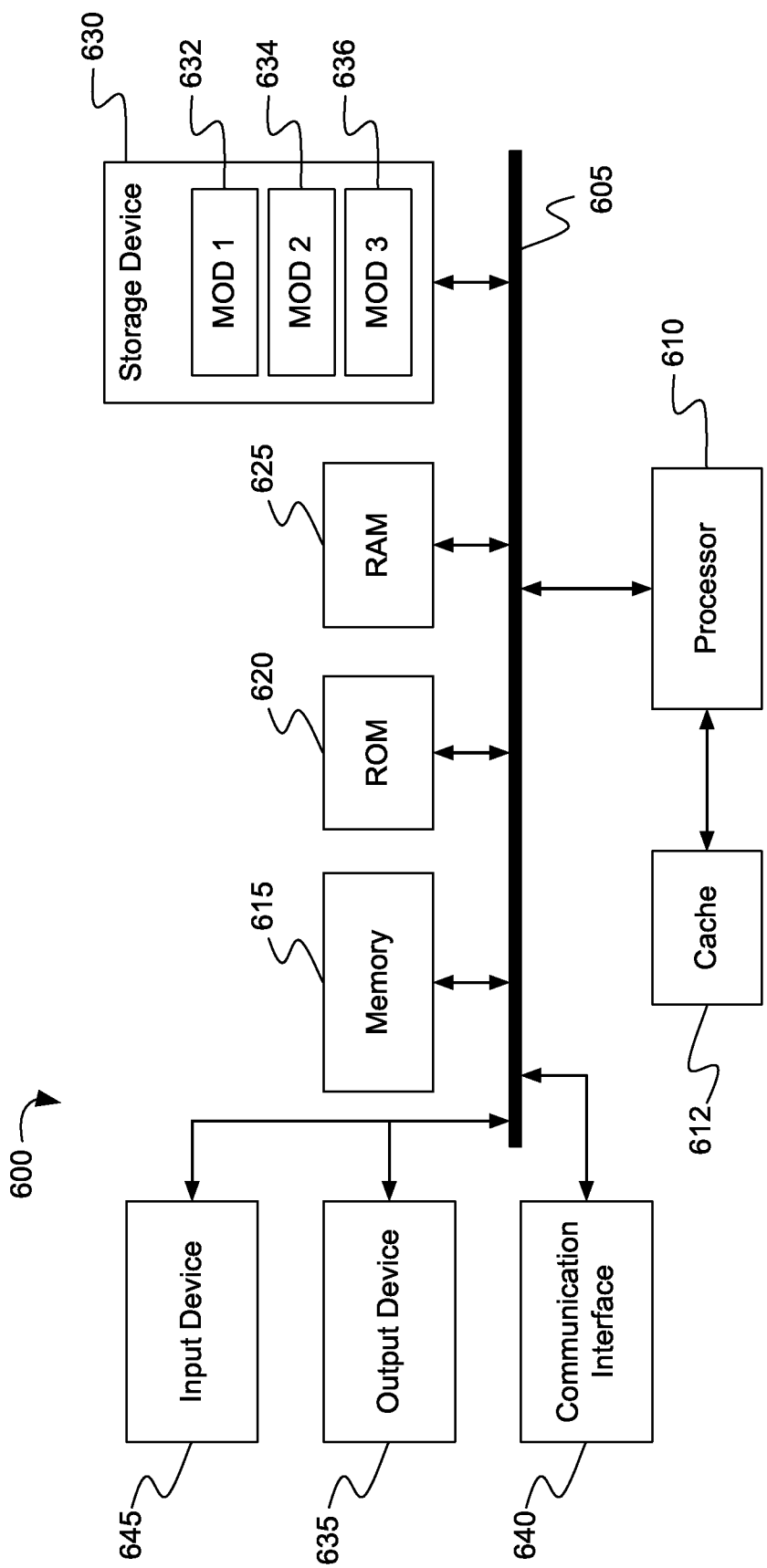
FIG. 6A shows an example possible system embodiment for implementing various embodiments of the present technology.
Figure 6B:
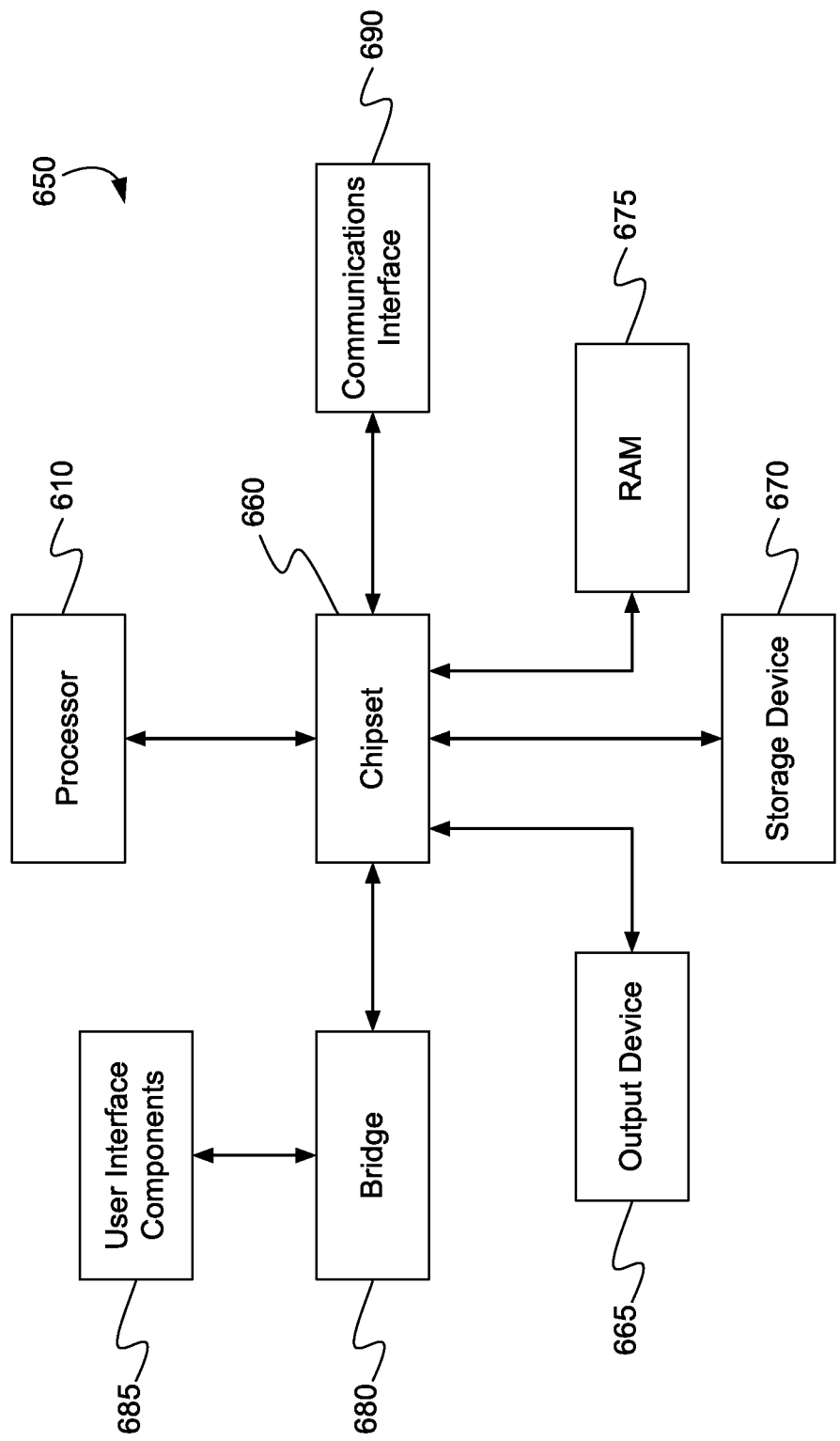
FIG. 6B shows an example possible system embodiment for implementing various embodiments of the present technology.

FIG. 6A and FIG. 6B show example possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Example system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 610, representative of any number of physically and/or logically distinct resources capable of executing software, firmware, and hardware configured to perform identified computations. Processor 610 can communicate with a chipset 660 that can control input to and output from processor 610. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 610 analyzing data stored in storage 670 or 675. Further, the machine can receive inputs from a user via user interface components 685 and execute appropriate functions, such as browsing functions by interpreting these inputs using processor 610.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer readable medium comprising instructions which, when executed by a computing system, cause the computing system to perform operations comprising:
    receiving a request to access a content item stored in content storage;
    obtaining an identifier for the content item, wherein the identifier comprises a name or pathname associated with the content item;
    generating one or more tokens based on the identifier;
    determining one or more token scores each corresponding to a respective one of the one or more tokens;
    generating a content item score based on the one or more token scores, wherein the content item score is calculated based at least on a maximum token score in the one or more token scores or a summation of the one or more token scores;
    determining that the content item is suspected of being associated with malicious content based on the content item score; and
    in response to determining that the content item is suspected of being associated with malicious content based on the content item score, performing at least one of a plurality of remedial operations with respect to the requested content item, the plurality of remedial operations comprising:
        preventing access to the content item,
        causing a message to be presented indicating that the content item is unavailable, and
        performing an anti-malware scan of a content of the content item.

2. The non-transitory computer readable medium of claim 1, wherein the one or more tokens correspond to respective portions of the identifier.

3. The non-transitory computer readable medium of claim 1, wherein each of the one or more token scores is calculated by:
    determining a ratio of a first number corresponding to a number of instances where the respective token appears in malware related content items and a second number corresponding to a number of instances where the respective token appears in substantially all content items in the content storage.

4. The non-transitory computer readable medium of claim 1, further comprising:
    determining an age of a user account associated with the request; and
    generating the content item score based on the one or more token scores and the age of the user account.

5. The non-transitory computer readable medium of claim 4, wherein generating the content item score based on the one or more token scores and the age of the user account comprises:
    determining that the age of the user account is at least a threshold amount of time; and
    increasing the content item score based on a value associated with the threshold amount of time.

6. The non-transitory computer readable medium of claim 1, wherein determining that the content item is suspected of being associated with malicious content based on the content item score comprises:
    comparing the content item score to a threshold value.

7. The non-transitory computer readable medium of claim 1, wherein generating the one or more tokens based on the identifier, comprises:
    identifying one or more delimiters contained in the identifier; and
    extracting tokens from the identifier based on the one or more delimiters.

8. A method comprising:
    receiving, by a content management system, a request to access a content item stored in content storage;
    obtaining, by the content management system, an identifier for the content item, wherein the identifier comprises a name or pathname associated with the content item;

generating, by the content management system, one or more tokens based on the item identifier;

determining, by the content management system, one or more token scores each corresponding to a respective one of the one or more tokens;

generating, by the content management system, a content item score based on the one or more token scores, wherein the content item score is calculated based at least on a frequency in which each token is found within identifiers for a plurality of content items stored in the content storage;

determining, by the content management system, that the content item is suspected of being associated with malicious content based on the content item score; and in response to determining that the content item is suspected of being associated with malicious content based on the content item score, performing at least one of a plurality of remedial operations with respect to the requested content item, the plurality of remedial operations comprising:

preventing access to the content item, causing a message to be presented indicating that the content item is unavailable, and performing an anti-malware scan of a content of the content item.

9. The method of claim 8, wherein the one or more tokens correspond to respective portions of the identifier.

10. The method of claim 8, wherein each of the one or more token scores is calculated by:

determining a ratio of a first number corresponding to a number of instances where the respective token appears in malware related content items and a second number corresponding to a number of instances where the respective token appears in substantially all content items managed by the content management system.

11. The method of claim 8, wherein the content item score corresponds to a maximum token score in the one or more token scores.

12. The method of claim 8, further comprising:

determining an age of a user account; and generating the content item score based on the token scores and the age of the user account.

13. The method of claim 8, wherein determining, by the content management system, that the content item is suspected of being associated with malicious content based on the content item score comprises:

comparing the content item score to a threshold value.

14. The method of claim 8, wherein generating, by the content management system, the one or more tokens based on the identifier, comprises:

identifying one or more delimiters contained in the identifier; and extracting tokens from the content.

15. A system, comprising:

one or more processors; and a memory having programming instructions stored thereon, which, when executed by the one or more processors, causes the system to perform operations, comprising:

receiving a request to access a content item stored in content storage;

obtaining an identifier for the content item, wherein the identifier comprises a name or pathname associated with the content item;

generating one or more tokens based on the identifier;

determining one or more token scores each corresponding to a respective one of the one or more tokens;

generating a content item score based on the one or more token scores, wherein the content item score is calculated based at least on a maximum token score in the one or more token scores or a summation of the one or more token scores;

determining that the content item is suspected of being associated with malicious content based on the content item score; and in response to determining that the content item is suspected of being associated with malicious content based on the content item score, performing at least one of a plurality of remedial operations with respect to the requested content item, the plurality of remedial operations comprising:

preventing access to the content item, causing a message to be presented indicating that the content item is unavailable, and performing an anti-malware scan of a content of the content item.

16. The system of claim 15, wherein the one or more tokens correspond to respective portions of the identifier.

17. The system of claim 15, wherein each of the one or more token scores is calculated by:

determining a ratio of a first number corresponding to a number of instances where the respective token appears in malware related content items and a second number corresponding to a number of instances where the respective token appears in substantially all content items managed by the system.

18. The system of claim 15, wherein the operations further comprise:

determining an age of a user account associated with the request; and generating the content item score based on the one or more token scores and the age of the user account.

19. The system of claim 18, wherein generating the content item score based on the one or more token scores and the age of the user account comprises:

determining that the age of the user account is at least a threshold amount of time; and increasing the content item score based on a value associated with the threshold amount of time.

20. The system of claim 15, wherein determining that the content item is suspected of being associated with malicious content based on the content item score comprises:

comparing the content item score to a threshold value.

* * * * *